United States Patent [19]
Nagasawa

[11] Patent Number: 5,526,124
[45] Date of Patent: Jun. 11, 1996

[54] IMAGE RECORDING DEVICE, IMAGE REPRODUCING DEVICE, IMAGE RECORDING/REPRODUCING DEVICE AND IMAGE RECORDING METHOD

[75] Inventor: Fumihiro Nagasawa, Kanagawa, Japan

[73] Assignee: Sony Corporation, Tokyo, Japan

[21] Appl. No.: 219,714

[22] Filed: Mar. 29, 1994

[30] Foreign Application Priority Data

Mar. 31, 1993 [JP] Japan .................................. 5-096850

[51] Int. Cl.⁶ ........................................................ H04N 5/78
[52] U.S. Cl. ........................... 358/310; 348/392; 358/335
[58] Field of Search ..................................... 358/335, 310; 360/22, 23; 348/439, 392; H04N 5/78

[56] References Cited

U.S. PATENT DOCUMENTS

| | | | |
|---|---|---|---|
| 4,920,424 | 4/1990 | Hosaka | 348/439 |
| 5,363,264 | 11/1994 | Cavanaugh | 358/335 |
| 5,365,271 | 11/1994 | Asano | 348/405 |

FOREIGN PATENT DOCUMENTS 0512626  11/1992  European Pat. Off. .

Primary Examiner—Howard W. Britton
Attorney, Agent, or Firm—Jay H. Maioli

[57] ABSTRACT

A video recording device, a video reproducing device and a video recording/reproducing device each have a simple configuration and the capacity to satisfy the broadcasting standards even though the number of scanning lines of the information recorded in their video recording region is less that the number of scanning lines in the broadcasting standards. If the number of the scanning lines of the first video information which are recorded into the video recording region on the recording medium is less than the number of scanning lines in the broadcasting standards, in recording, the second supplemental video information which corresponds to the deficient scanning lines are recorded into the additional information recording region, in reproducing, the first video information and the second video information are reproduced, the digital video signals having a sufficient number of scanning lines are then reconstituted based on the first and second video information to satisfy the broadcasting standards.

13 Claims, 6 Drawing Sheets

IMAGE RECORDING DEVICE, IMAGE REPRODUCING DEVICE, IMAGE RECORDING/REPRODUCING DEVICE AND IMAGE RECORDING METHOD

BACKGROUND OF THE INVENTION

1. Field of the Invention

This invention relates to a video recording device, a video reproducing device and a video recording/reproducing device and; more particularly, is suitably applicable to a digital video tape recorder (VTR) which is developed mainly for home use other than for use in broadcasting stations.

2. Description of the Related Art

A digital video tape recorder (VTR) is proposed for home use rather than for broadcasting station use. This type of digital video tape recorder has been required to increase the recording efficiency of image signals in order to miniaturize the size, thereby digital image signals are compressively coded to record and reproduce. An orthogonal transformation coding method such as Discrete Cosine Transform (DCT) has been used as the compression algorithm.

In the orthogonal transformation coding method such as DCT, it is required that inputted video signals are partitioned into blocks of, for example 8×8 pixels for the sake of compression processing. Therefore, it is proposed that the recording region of the video signals is defined as the region which is composed of an integral multiple of a block of 8 pixels×8 lines. For instance, on the number of scanning lines, with regard to the 525-line formation video signals, 480 lines are defined as the recording region, on the other hand, 576 lines in the 625-line formation video signals are defined as the recording region. Thus, the tape-format of a digital VTR for the purpose of home use is satisfied by merely recording the region displayed on a TV screen, so that all of the scanning lines required by the broadcasting standards will not be recorded.

This type of the digital VTR for the purpose of home use has much less deterioration of picture quality compared with an analog VTR, since the video signals are digitally recorded. Accordingly, if such digital VTR becomes applicable for broadcasting station use, a VTR for broadcasting station use can be obtained at extremely lower cost and with simple construction compared with conventional digital VTR for broadcasting station use.

However, the video signals which are required to be recorded by the broadcasting standards, e.g., 485 scanning lines of the video signals in the case of the 525-line formation or 576 and a half lines in the case of the 625-line formation, are not recorded in the digital VTR for the purpose of home use, so that it cannot be applied to broadcasting station use under the present conditions.

To solve this problem, it is considered that the number of the scanning lines be increased by an integral multiple of 8 lines, e.g., 488 scanning lines of the video signals in the case of the 525-line formation or 584 lines in the case of the 625-line formation, to satisfy the requirement of the broadcasting standards. However, as a recording method of digital VTR for the purpose of home use, there is a problem that it will take longer for compressive-coding processing and simultaneously recording efficiency will decrease, so that this is not an adequate solution.

SUMMARY OF THE INVENTION

In view of the foregoing, an object of this invention is to provide a video recording device, a video reproducing device, a video recording/reproducing device and a video recording method which are capable of satisfying the broadcasting standards with simple construction even though the number of the scanning lines recorded into the video recording region is insufficient upon comparison with the requirement of the broadcasting standards.

The foregoing object and other objects of the invention have been achieved by the provision of a video recording device 1 for coding the digital video signals S1 and then recording the coded digital video signals S1 into the recording medium. If the number of the scanning lines of the first video information S2 to be recorded into the video recording region $AR_{V1}$ is less than a predetermined number of the scanning lines of the broadcasting standards, the second video information S3 which corresponds to the deficient scanning lines is recorded into the additional information recording region $AR_{V2}$ allocated on the recording medium.

Further in the present invention, a video reproducing device 10 for reproducing the coded digital video signals S1 being recorded on the recording medium reproduces the first video information S2 recorded within the video recording region $AR_{V1}$ allocated on the recording medium, and also reproduces the second video information S3 recorded within the additional information recording region $AR_{V2}$ which corresponds to the deficient number of scanning lines in the case where the number of the scanning lines of the first video information S2 is less than the predetermined number of scanning lines in the broadcasting standards, and then restores the digital video signals having sufficient scanning lines to satisfy the requirement of the broadcasting standards based on the first video information S2 and the second video information S3.

Further, in the present invention, the video recording/reproducing device 1, 10 is provided for recoding and reproducing coded digital video signals S1 into the predetermined recording medium. In recording, if the number of the scanning lines of the first video information S2 to be recorded into the video recording region $AR_{V1}$ on the recording medium is less than the predetermined number of the scanning lines of the broadcasting standards, the video recording/reproducing device 1, 10 records the second video information S3 which corresponds to the deficient scanning lines into the additional information recording region $AR_{V2}$ allocated on the recording medium. In reproducing, the video recording/reproducing device 1, 10 reproduces the first video information S2 recorded within the video recording region $AR_{V1}$ on the recording medium and the second video information S3 recorded within the additional information recording region $AR_{V2}$ on the recording medium, and then restores the digital video signals having sufficient number of scanning lines to satisfy the requirement of the broadcasting standards based on the first and the second video information S2 and S3.

In recording, if the number of the scanning lines of the first video information S2 to be recorded into the video recording region $AR_{V1}$ on the recording medium is less than the predetermined number of the scanning lines of the broadcasting standards, the second video information S3 which corresponds to the deficient scanning lines is recorded into the additional information recording region $AR_{V2}$. In reproducing, the first video information S2 which is recorded within the video recording region $AR_{V1}$ on the recording medium and the second video information S3 which corresponds to the deficient number of scanning lines and is recorded within the additional information recording region $AR_{V2}$ on said recording medium are reproduced. Then the digital video signals having a sufficient number of scanning lines is restored to satisfy the requirement of the broadcasting standards based on the first and the second video information S2 and S3. Thereby, even if the number of the scanning lines recorded into the video recording region $AR_{V1}$ is less than the broadcasting standards, the requirement of the broadcasting standards can be satisfied with the simple construction of the present invention.

As mentioned above, in accordance with the present invention, in recording, if the number of the scanning lines of the video information to be recorded into the video recording region on the recording medium is less than with the number of the scanning lines stated in the broadcasting standards, the video information which corresponds to the deficient scanning lines is recorded into the additional information recording region. In reproducing, the digital video signals having a sufficient number of scanning lines is reconstituted to satisfy the requirement of the broadcasting standards, based on the video information. Thus, the video reproducing device, and the video recording/reproducing device can be realized in which even if the number of the scanning lines recorded into the video recording region is less than with the broadcasting standards, the requirement of the broadcasting standards can be satisfied with the simple construction of the present invention.

The nature, principle and utility of the invention will become more apparent from the following detailed description when read in conjunction with the accompanying drawings in which like parts are designated by like reference numerals or characters.

DETAILED DESCRIPTION OF THE EMBODIMENTS

Preferred embodiments of this invention will be described with reference to the accompanying drawings:

(1) The Principle of the Invention

Figure 1:
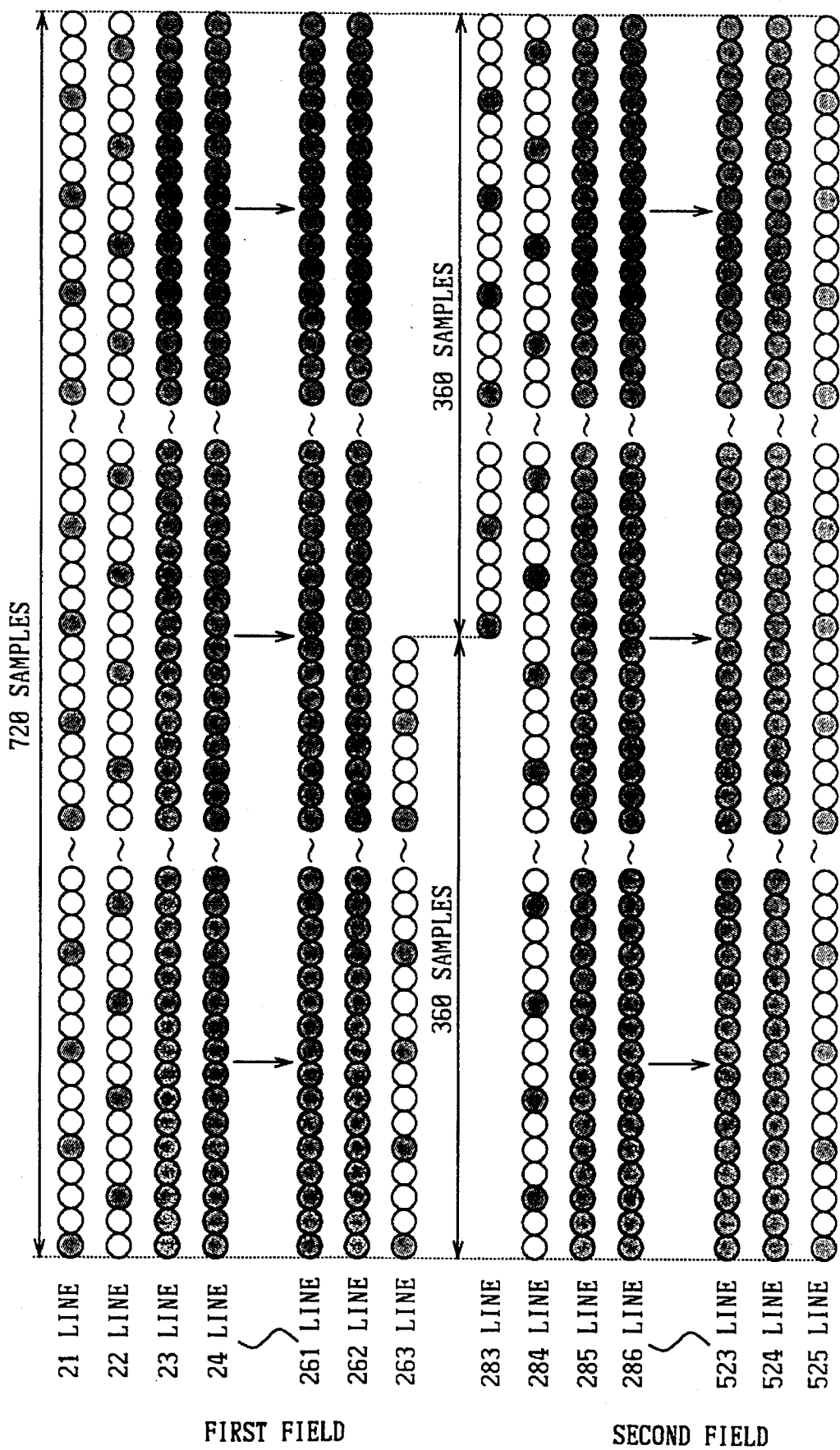
FIG. 1 is a schematic diagram explaining the method for recording the video information of 525-line formation according to the principle of the present invention.

FIG. 1 shows a digital VTR using a method for recording video information of this invention, in which the video information which the digital video signals of the 525-line formation are compressive-coded is recorded with the component formation. In this embodiment, when the 23rd to 262nd lines contained in the first field as well as the 285th to 524th lines contained in the second field are recorded in the video recording region, a total of five lines composed of the 21st line, the 22nd line and the half of the 263rd line each contained in the first field, and the half of the 283rd line, the 284th line and the 525th line each contained in the second field are recorded into the additional information recording region as the scanning lines being less than the broadcasting standards.

The scanning lines are sampled with every four pixels to be recorded into the additional information recording region and the phase of the sampling position between the adjacent lines, such as the 21st and the 22nd lines, 283rd line and 284th line, are each shifted by two pixels so as to be recorded with a suitable method for the interpolating process during reproduction. The pixel data to be recorded is restricted to the luminance information only in consideration of the capacity of the additional information recording region. The color difference signals are not recorded.

In cases where the recording scheme by way of the component signals is 4:2:2, 4:2:0 or 4:1:1 and the like, when the luminance information of a hundred and eighty pixels per line which are quantized with eight bits which is five lines, the total amount of information of the recorded data which is recorded into the additional information recording region per frame is nine hundred bytes, as shown in the following equation:

$$(720/4) \times 8 \times 5 = 7,200 \text{ bits} = 900 \text{ bytes} \tag{1}$$

Figure 2:
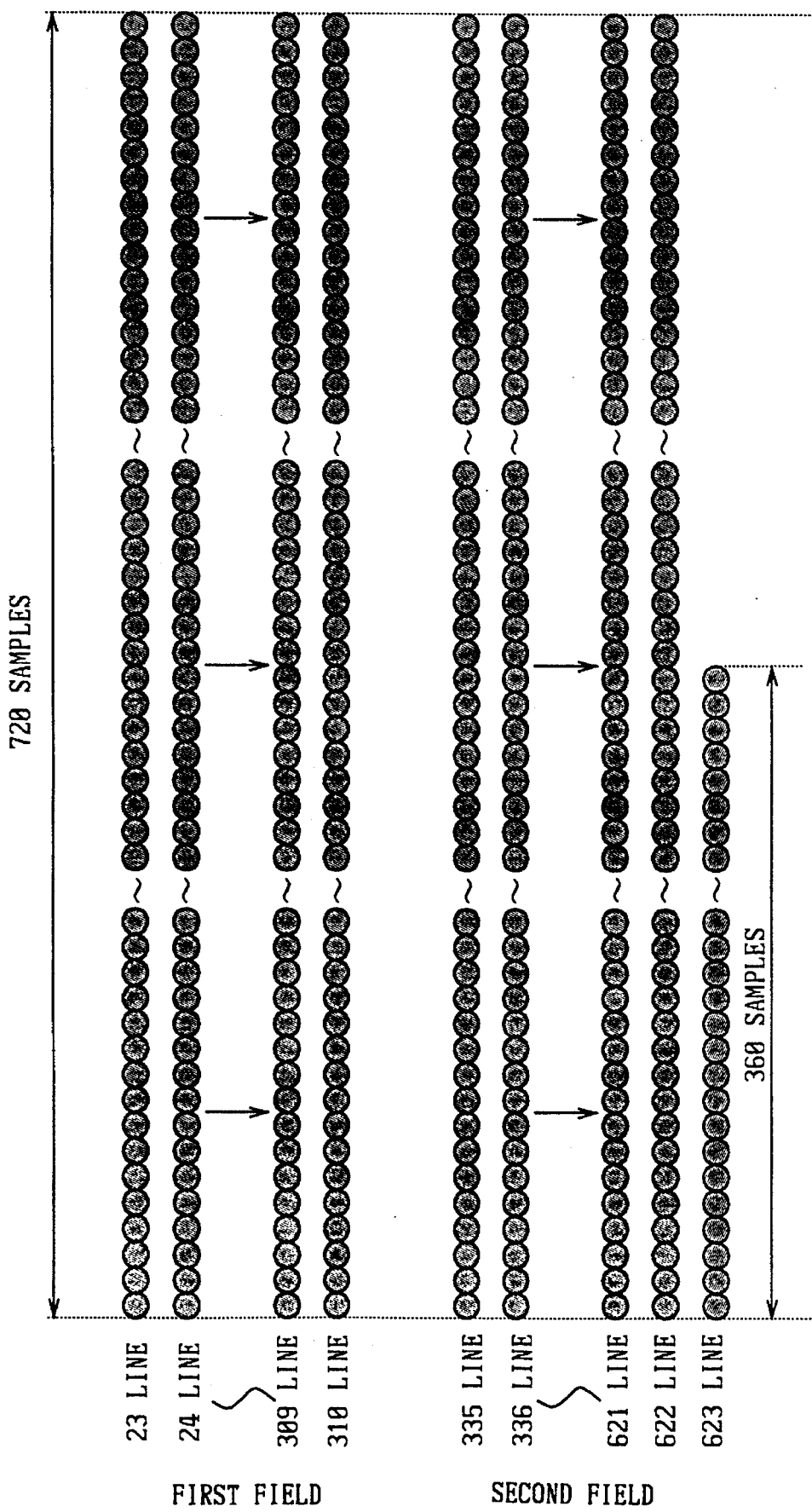
FIG. 2 is a schematic diagram explaining the method for recording the video information of 625-line formation according to the principle of the present invention.

FIG. 2 shows a digital VTR of this invention where the video signal being compressive-coded results from digital video signals having the 625-line formation scanning lines recorded with the component formation. In this embodiment, in the case where the 23rd to 310th lines contained in the first field and the 335th to 622nd lines contained in the second field are recorded into the video recording region, the video information of the second field composed of the half of the 623rd line are recorded into the additional information recording region by way of the scanning line which is lower than the broadcasting standards.

In the case where the recording formation by way of the component signals is 4:2:0, the total amount of information of the recorded data which is recorded into the additional information recording region per frame; summing up three hundred and sixty pixels of the luminance information and a hundred and eighty pixels of the color difference signals, will be five hundred and forty bytes, as shown in the following equation:

$$360 \times 8 + 180 \times 8 = 4,320 \text{ bits} = 540 \text{ bytes} \tag{2}$$

Thus, in recording, if the number of the scanning lines of the video information recorded into the video recording region is less than the required number of scanning lines of the broadcasting standards, the video information which corresponds to the deficient scanning lines are recorded into the additional information recording region, thereby, in reproducing, the video information being recorded within the video recording region and the additional information recording region on the recording medium is reproduced, so that the digital video signals having sufficient number of scanning lines to satisfy the requirement of the predetermined broadcasting standards can be restored. Hereby, the digital VTR for home use can be utilized as a VTR for broadcasting station use.

(2) The Video Recording Device of the Embodiment

Figure 3:
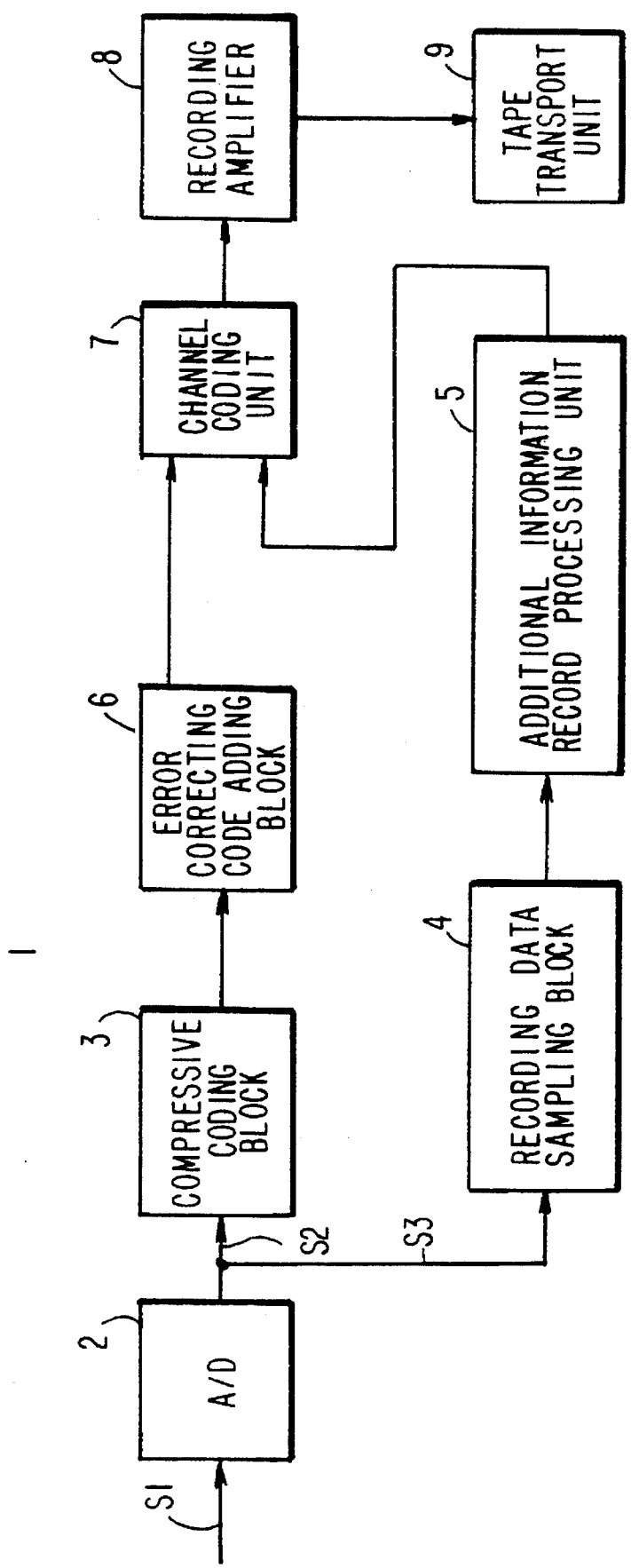
FIG. 3 is a block diagram showing an embodiment of the construction of the video recording device according to the present invention.

In FIG. 3, 1 generally designates a video recording device such as the digital VTR having the main purpose of home use. The inputted video signals S1 are converted to the digital signals in the analog-to-digital conversion circuit 2.

The video information S2 which is recorded into the video recording region out of the video signals S1 converted to the digital signals (the 23rd to 262nd lines and the 285th to 524th lines in FIG. 1, the 23rd to 310th lines and the 335th to 622nd lines in FIG. 2) is partitioned into blocks of for example 8 pixels×8 lines in the compressive-coding block 3 to perform the compressive-coding process utilizing DCT or the like, so that this video information S2 is compressed to the predetermined amount of data which can be recorded on the tape and inputted to the error-correcting-code adding block 6.

Meanwhile, the video information S3 which is to be recorded into the additional information recording region out of the video signals S1 (the 21st and 22nd lines, the half of the 263rd line, the half of the 283rd line, the 284 line and the 525th line in FIG. 1, the half of the 623rd line in FIG. 2) is processed by the thinning or sampling process which was previously described with regard to FIG. 1 and FIG. 2 to be recorded into the additional information recording region in the recording data sampling unit 4, and the data arranging process is input to the recording data sampling block 4 for being recorded in the additional information record processing unit 5 so as to be input to the error correction code adding block 6.

In the error correction code adding block 6, the error correction code is added to the inputted data. The resultant data is then coded in the channel coding unit 6 to be recorded on a magnetic tape so that the coded data is converted to the recording signals through the recording amplifier 8 and supplied to the magnetic head of the tape transport unit 9. In this manner, the video information is recorded into the video recording region and the additional information recording region, both residing in the helical recording track on the magnetic tape.

Figure 4A:
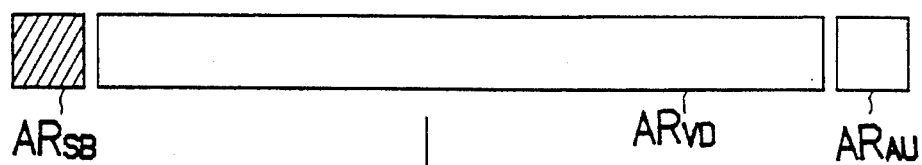
FIGS. 4A and 4B are schematic diagrams explaining the format of the recording track on the magnetic tape according to the present invention.
Figure 4B:
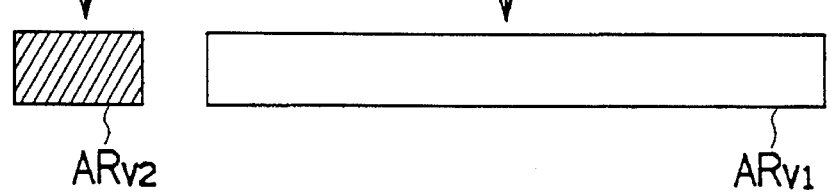

This helical recording track is preferably constructed as shown in FIGS. 4A and 4B, in which the video information S2 is recorded into the main recording region $AR_{V1}$ of the video recording region $AR_{VD}$, and simultaneously the video information S3 is recorded into the additional information recording region $AR_{V2}$ composed of the part of which the video signal is not recorded in the video recording region $AR_{VD}$. The subcode recording region $AR_{SB}$ and the audio recording region $AR_{AU}$ are allocated in the vicinity of the video recording region $AR_{VD}$.

(3) The Video Reproducing Device of the Embodiment

Figure 5:
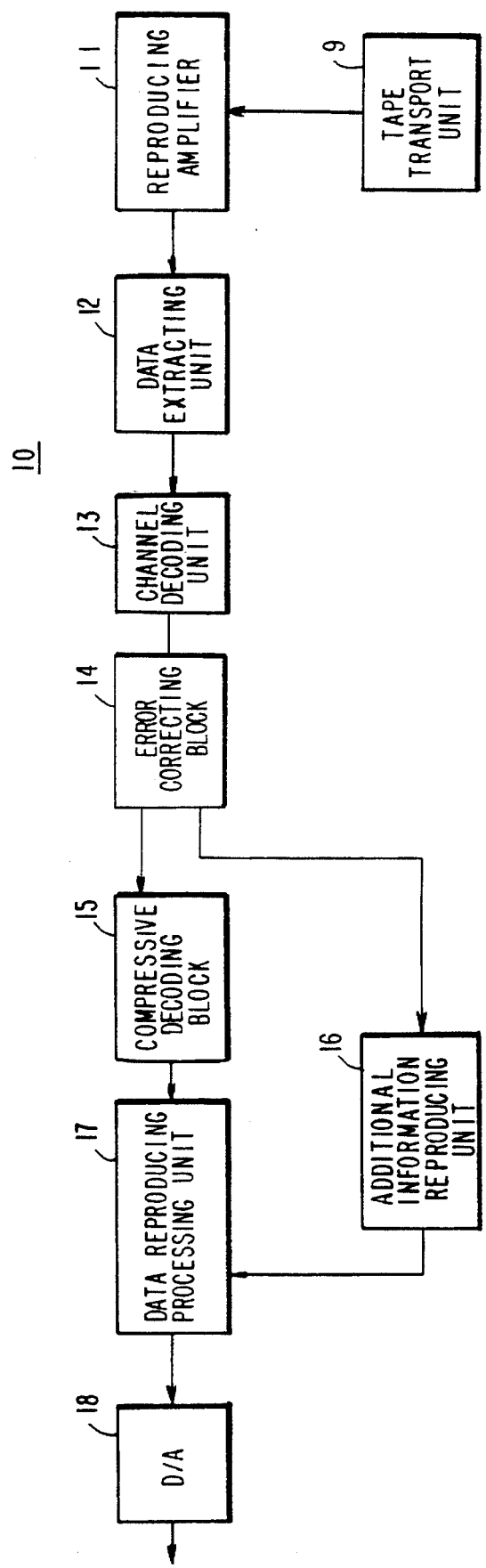
FIG. 5 is a block diagram showing an embodiment of the construction of the video reproducing device according to the present invention.

Referring to FIG. 5, 10 generally designates the video reproducing device such as a digital VTR having the main purpose of home use. The reproducing signals S10 obtained at the magnetic head of the tape transportion unit 9 are amplified in the reproducing amplifier 11. The amplified reproducing signals are input to the data extracting unit 12 to generate the reproducing clock from this reproducing signal, so that data is extracted from this reproducing signal based on this reproducing clock.

The data extracted at the data extracting unit 12 is, in a channel-decoding unit 13, converted back to the same digital data as the data before it was channel-coded from the recorded data for magnetic-recording, and the error correction process is performed at the error correcting block 14. The data which was reproduced from the video recording region $AR_{VD}$ ($AR_{V1}$) is decoded to form a digital video signal from a compressed condition in the compressive-decoding block and input to the data reproducing processing unit 17.

The data reproduced from the additional information recording region is input from the error correction unit 14 to the additional information reproducing unit 16 to extract the data recorded within the additional information recording region $AR_{V2}$ from the reproduced data, so that the extracted data is input to the data reproduction processing unit 17. In the data reproduction processing block 17, the digital video signals both the data in the video recording region $AR_{VD}$ ($AR_{V1}$) and the data in the additional information recording region $AR_{V2}$, are restored as before the recording, so that these digital video signals obtained in this manner are converted into analog signals in the digital-to-analog converting circuit 18 to be output as the video signals in conformity with the broadcasting standards.

Figure 6:
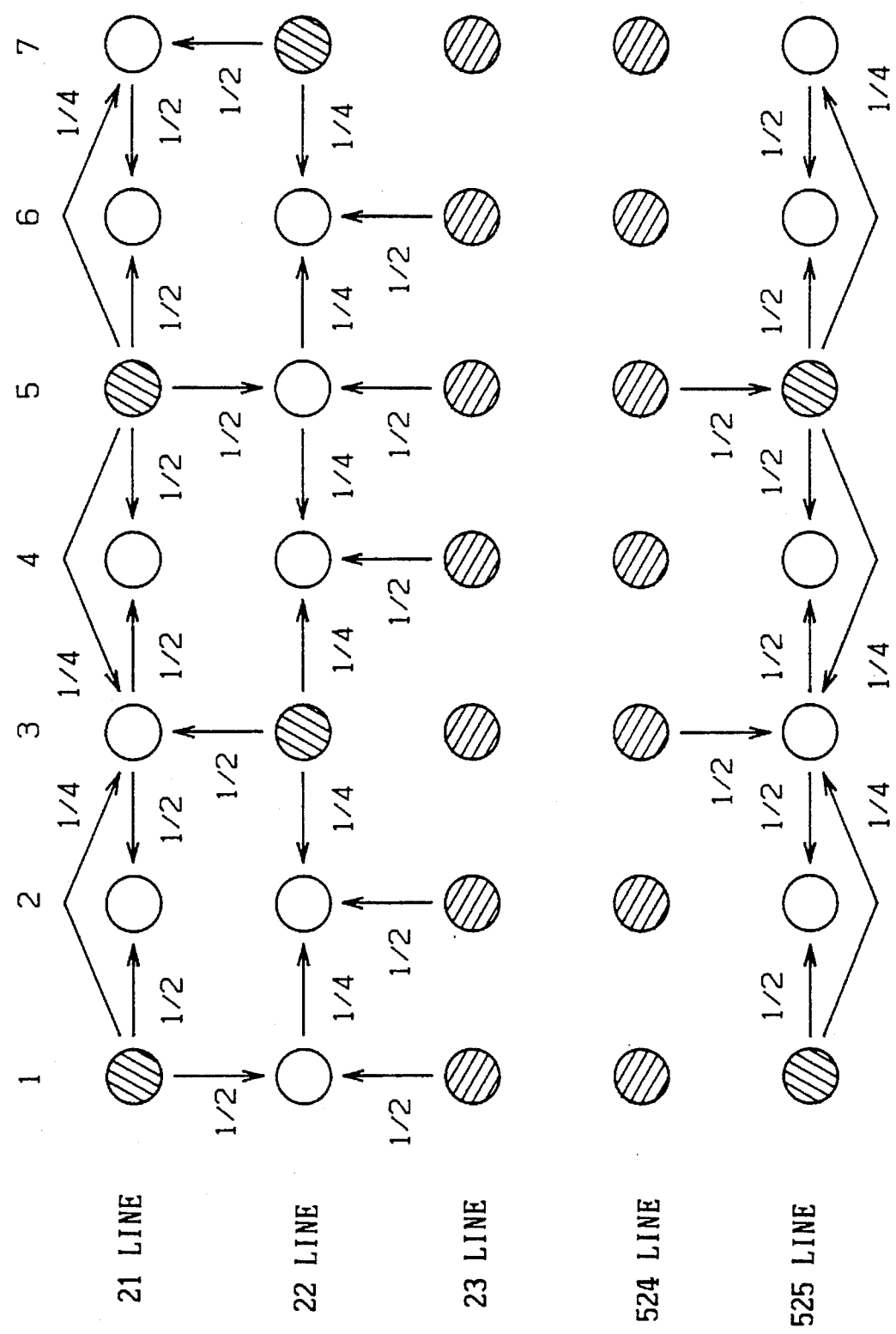
FIG. 6 is a schematic diagram showing the method of the pixel interpolation which is executed as a data reproducing process in the video reproducing device of FIG. 5.

With respect to the data reproducing process of the digital video signals of the 525-line formation, as shown in FIG. 6, the data of the unrecorded pixels are interpolated based on both the pixel data recorded within the additional information recording region $AR_{V2}$ and the pixel data recorded within the video recording region $AR_{VD}$ ($AR_{V1}$) at the time of reproducing.

In practice, the interpolation of the data of the unrecorded pixels is achieved by weighting and adding. The luminance information of the pixel data recorded on the additional information recording region $AR_{V2}$ or the video recording region $AR_{VD}$ ($AR_{V1}$) are weighted to ½ or ¼ by bit shifting, and simultaneously the luminance information of the adjacent pixel data are added to each other as shown in FIG. 6, so that the luminance information of the unrecorded pixel data is interpolated. As for the color difference information, the color difference information of the pixel data recorded on the video recording region $AR_{VD}$ ($AR_{V1}$) is weighted to ½ or ¼ by bit shifting to interpolate the color difference information of the unrecorded pixel data which is adjacent upward or downward.

As for the data reproducing process of the digital video signals of 625-line formation, the pixel data of the half of the 623rd line recorded within the additional information recording region $AR_{V2}$ is merely added after the pixel data of the 622nd line recorded within the video recording region $AR_{VD}$ ($AR_{V1}$).

(4) The Effect of the Embodiment

In accordance with the above construction of the embodiment, the video information of the scanning lines which are required by the broadcasting standards but are not recorded into the video recording region $AR_{VD}$ ($AR_{V1}$) on the tape is recorded into the additional information recording region $AR_{V2}$ on the magnetic tape. In reproducing, the video recorded within the additional information recording region $AR_{V2}$ is added to the video information recorded within the video recording region $AR_{VD}$ ($AR_{V1}$) to be reproduced, so that the reproduced signals are obtained which can satisfy the broadcasting standards. Therefore, a digital VTR for home use which could not be utilized formerly for use in broadcasting stations because of insufficient number of scanning lines becomes applicable for use in broadcasting stations.

In this way, the scanning lines of the broadcasting signals can be recorded completely be utilizing the additional information recording region $AR_{V2}$ of the digital VTR for home use and accordingly, a low cost digital VTR for broadcasting station use is attained. In addition, it becomes possible to reproduce the video signals on the tapes recorded for broadcasting use by utilizing a VTR for popular use.

(5) Other Embodiments

Figure 7A:
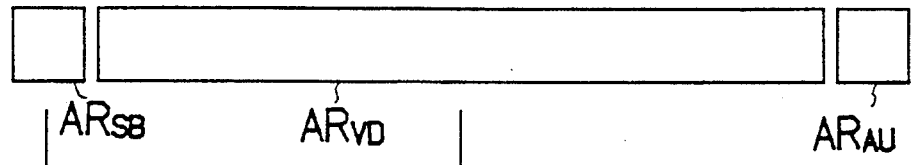
FIGS. 7A and 7B are schematic diagrams showing the another embodiment of the recording format on the magnetic tape.
Figure 7B:
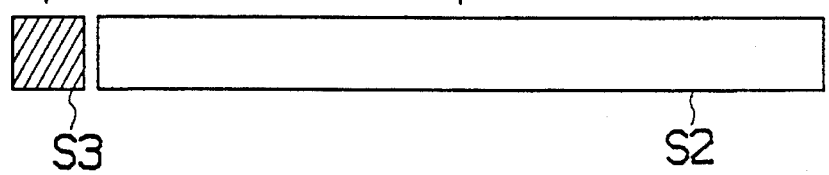

In the above-mentioned embodiment, the video information of the scanning lines which is not recorded in the video recording region $AR_{VD}$ ($AR_{V1}$) but is required by the broadcasting standards is recorded into the additional information recording region $AR_{V2}$ contained in the video recording region $AR_{VD}$. Instead of this, such video information is recorded into the subcode recording region $AR_{SB}$ which is allocated ahead of the video recording region $AR_{VD}$ as shown in FIGS. 7A and 7B and as a result a similar effect can be attained.

In the description of the aforementioned embodiments, the present invention is applied to the VTR having the main purpose of popular use. However, the present invention is not only limited to this, but is suitable to be widely applied to a video recording and/or reproducing device such as a video disc device, a magnetic disc device, an optical disc device and so on.

While the present invention has been described in connection with the preferred embodiments of the invention, it will be obvious to those skilled in the art that various changes and modifications may be made which do not depart from the spirit and scope of the invention and, therefore, the appended claims cover all such changes and modifications as fall within the true spirit and scope of the invention.

What is claimed is:

1. A video signal recording apparatus for recording a coded video signal comprising:

coding means for coding first video information of first predetermined lines of said video signal;

signal processing means for signal processing second video information of second predetermined lines of said video signal excepting coded line signals;

first recording means for recording said first video information onto a first video signal recording area on a recording medium; and second recording means for recording said second video information onto a second video signal recording area on the recording medium.

2. The video apparatus according to claim 1, wherein:

said signal processing means for signal processing the second video information comprises sampling means in which input pixel data of said second predetermined lines is thinned and sampled to form said second video information.

3. The video recording apparatus according to claim 1, wherein:

said signal processing means for signal processing said second video information comprises sampling means, in which an input pixel data of said second predetermined lines is thinned to sample a luminance information by every four pixels, and simultaneously, to sample a luminance signal by every four pixels shifting two pixels between adjacent ones of said second predetermined lines of said video signal to form said second video information.

4. A video reproducing apparatus for reproducing a coded digital video signal recorded on a recording medium, comprising:

first reproducing means for reproducing a first video information of first predetermined lines recorded onto a first video signal recording area on said recording medium;

second reproducing means for reproducing a second video information formed of second predetermined lines excepting said first predetermined lines recorded onto a second video signal recording area on said recording medium; and restoring means for restoring said digital signal having a predetermined total number of lines, based on said reproduced first and second video information.

5. The video reproducing apparatus according to claim 4, wherein input pixel data was thinned and discarded prior to recording said second video information; and further comprising interpolating means for providing replacement approximations of pixels discarded by thinning and to restore the reproduced second video information.

6. The video reproducing apparatus according to claim 5, wherein:

said interpolating means comprises weighting means for weighting the luminance information of the unrecorded pixels discarded by said thinning, and simultaneously for add-calculating the luminance information of recorded pixels adjacent the unrecorded and discarded pixels.

7. The video reproducing apparatus according the claim 5 wherein:

color information of the unrecorded pixels are interpolated from a color information obtained of the recorded pixels adjacent and above or below color information obtained by reproducing said first video information.

8. The video reproducing apparatus according to claim 4, wherein input pixel data to be recorded is thinned and sampled to form said second video signal; and further comprising interpolating means for providing replacement approximations of pixels discarded by thinning and to restore the reproduced second video signal.

9. The video reproducing apparatus according to claim 8, wherein:

said interpolating means comprises weighting means for weighting the luminance information of unrecorded pixels discarded by said thinning, and simultaneously for add-calculating the luminance information of recorded pixels which are adjacent the unrecorded and discarded pixels.

10. The video reproducing apparatus according to claim 8, wherein:

a color information of said unrecorded pixels are interpolated by color information of pixels which are adjacent and above or below color information obtained by reproducing said first video information.

11. A video recording/reproducing apparatus for recording and reproducing a coded digital video signal onto and from a recording medium, comprising:

coding means for coding first video information of first predetermined lines of said digital video signal;

signal processing means for signal processing second video information of second predetermined lines of said digital video signal excepting a coded line signal;

first recording means for recording said first video information in a first video signal recording area on said recording medium;

second recording means for recording said video information in a second video signal recording area on said recording medium;

first reproducing means for reproducing the first video information of said first predetermined lines recorded in the first video signal recording area on said recording medium;

second reproducing means for reproducing said second video information of said second predetermined lines excepting said first predetermined lines recorded in the second video signal recording area on said recording medium; and restoring means for restoring said digital signal having a predetermined total number of lines, based on said reproduced first and second video information.

12. The video recording/reproducing apparatus according to claim 11, wherein:

said signal processing means for signal processing said second video information comprises sampling means in which input pixel data of said second predetermined lines is thinned and sampled to form said second video information.

13. The video recording apparatus according to claim 11, wherein:

said signal processing means for signal processing said second video information comprises sampling means in which an input pixel data of said second predetermined lines is thinned to sample a luminance information by every four pixels and simultaneously to sample a luminance signal by every four pixels shifting two pixels between adjacent ones of said second predetermined lines to form said second video information.

* * * * *

UNITED STATES PATENT AND TRADEMARK OFFICE
CERTIFICATE OF CORRECTION

PATENT NO. : 5,526,124
DATED : June 11, 1996
INVENTOR(S) : Fumihiro NAGASAWA

It is certified that error appears in the above-indentified patent and that said Letters Patent is hereby corrected as shown below:

In the Abstract, line 7, change "that" to —than—

Col. 1, line 25, after "example" insert —,—
Col. 3, line 11, delete "with"
        line 22, delete "with"
Col. 5, line 7, after "of" insert —,—
        line 8, after "example" insert —,—
Col. 6, line 6, after "signals" insert —,—
        line 59, after "and" insert —,—
Col. 7, line 5, after "7B" insert —,—

In the Claims:
    Col. 8, line 20, delete "obtained"

Signed and Sealed this

Fourth Day of March, 1997

Attest:

BRUCE LEHMAN

Attesting Officer

Commissioner of Patents and Trademarks